United States Patent
Feldhues et al.

(10) Patent No.: US 9,447,263 B2
(45) Date of Patent: Sep. 20, 2016

(54) RUBBER MIXTURES CONTAINING SHORT-CHAIN ALKYL ESTERS OF GLYCERIN

(71) Applicant: LANXESS Deutschland GmbH, Cologne (DE)

(72) Inventors: Ulrich Feldhues, Bergisch Gladbach (DE); Heinz Unterberg, Dormagen (DE); Hermann-Josef Weidenhaupt, Pulheim (DE); Melanie Wiedemeier-Jarad, Dormagen (DE); Joerg Hagemann, Cologne (DE)

(73) Assignee: LANXESS Deutschland GmbH, Cologne (DE)

( * ) Notice: Subject to any disclaimer, the term of this patent is extended or adjusted under 35 U.S.C. 154(b) by 0 days.

(21) Appl. No.: 14/443,084

(22) PCT Filed: Dec. 4, 2013

(86) PCT No.: PCT/EP2013/075449
§ 371 (c)(1),
(2) Date: May 15, 2015

(87) PCT Pub. No.: WO2014/086810
PCT Pub. Date: Jun. 12, 2014

(65) Prior Publication Data
US 2015/0291782 A1    Oct. 15, 2015

(30) Foreign Application Priority Data

Dec. 4, 2012   (EP) .................................... 12195403
Apr. 10, 2013  (EP) .................................... 13163140

(51) Int. Cl.
| | | |
|---|---|---|
| C08K 3/04 | (2006.01) | |
| C08K 5/10 | (2006.01) | |
| C08L 21/00 | (2006.01) | |
| C08L 7/00 | (2006.01) | |
| C08L 9/06 | (2006.01) | |
| B60C 1/00 | (2006.01) | |
| C08L 9/00 | (2006.01) | |

(52) U.S. Cl.
CPC . *C08L 9/06* (2013.01); *B60C 1/00* (2013.01); *C08K 3/04* (2013.01); *C08K 5/10* (2013.01); *C08L 7/00* (2013.01); *C08L 9/00* (2013.01); *C08L 21/00* (2013.01); *C08L 2205/02* (2013.01); *C08L 2205/03* (2013.01); *C08L 2205/06* (2013.01); *C08L 2312/00* (2013.01)

(58) Field of Classification Search
None
See application file for complete search history.

(56) References Cited

U.S. PATENT DOCUMENTS

| | | | | |
|---|---|---|---|---|
| 4,352,822 A | * | 10/1982 | Cherukuri | A23G 4/08 426/3 |
| 4,452,820 A | | 6/1984 | D'Amelia et al. | |
| 5,266,336 A | * | 11/1993 | McGrew | A23G 4/06 426/4 |
| 5,362,777 A | | 11/1994 | Tomka | |
| 6,117,928 A | | 9/2000 | Hiltunen et al. | |
| 8,026,314 B2 | | 9/2011 | Hansel et al. | |
| 2007/0042078 A1 | * | 2/2007 | Miladinov | A23G 4/06 426/3 |
| 2007/0042079 A1 | * | 2/2007 | Miladinov | A23G 4/08 426/5 |
| 2007/0098845 A1 | * | 5/2007 | Soper | A23G 4/06 426/5 |
| 2007/0104829 A1 | * | 5/2007 | Soper | A23G 4/06 426/5 |
| 2007/0254826 A1 | * | 11/2007 | Kindel | A23F 3/405 512/25 |
| 2008/0138465 A1 | * | 6/2008 | Soper | A23G 4/08 426/4 |
| 2011/0196071 A1 | | 8/2011 | Mentink et al. | |
| 2014/0155518 A1 | | 6/2014 | Wiedemeier et al. | |
| 2015/0291782 A1 | * | 10/2015 | Feldhues | B60C 1/00 523/156 |

FOREIGN PATENT DOCUMENTS

| | | |
|---|---|---|
| DE | 102010005558 A1 | 7/2011 |
| GB | 369576 | 3/1932 |
| GB | 637574 | 5/1950 |
| JP | 2002254894 A | 9/2002 |
| WO | 2008019461 A1 | 2/2008 |

OTHER PUBLICATIONS

European Search Report from European Application No. 12195403, dated Feb. 28, 2013, two pages.

* cited by examiner

*Primary Examiner* — Peter A Salamon

(57) ABSTRACT

The invention relates to rubber mixtures comprising at least in each case one nonpolar rubber, carbon black, and short-chain alkyl esters of glycerol, production of these, use, and the vulcanizates thus obtainable.

17 Claims, No Drawings

RUBBER MIXTURES CONTAINING SHORT-CHAIN ALKYL ESTERS OF GLYCERIN

The present invention relates to novel rubber mixtures comprising short-chain esters of glycerol, processes for the production and vulcanization of the rubber mixtures, the use of the rubber mixtures for the production of vulcanizates, vulcanizates obtained through use of the rubber mixtures, rubber products comprising said vulcanizates, and vehicles comprising said rubber products.

The demands placed upon the physical properties of rubber mixtures are constantly increasing: by way of example, legislation and economic factors are causing tire producers to reduce rolling resistance, but of course it is not permissible to achieve this by reducing wet grip, which is a property relevant to safety; nor is it acceptable that this is attended by an increase in rolling noise. It is known that reinforcing fillers such as carbon black, silica, cellulose, or phyllosilicates can be added in order to reduce rolling deformation energy and/or in order to improve dynamic running properties, and also abrasion.

However, the reinforcing fillers frequently increase the Mooney viscosity of the rubber mixture, and therefore reduce its processability. To counter this, auxiliaries are therefore mostly also added, alongside the reinforcing fillers, to the rubber mixture, these being intended to improve its processability. Examples of materials used for this purpose are fatty acid esters, fatty acid salts, or plasticizer oils, but while these improve flowability they considerably reduce the hardness of the vulcanizates, thus restricting the reinforcing effect of the filler; an automobile tire produced therefrom therefore has unsatisfactory running performance, particularly around curves. Although a further increase in the proportion of reinforcing filler then in turn increases vulcanizate hardness, it leads at the same time to higher mixture viscosity, which is then disadvantageous for the processability of the vulcanizate. The same applies to reduction of the plasticizer oil.

For purposes of good processability, a rubber mixture should exhibit not only low viscosity (Mooney viscosity ML 1+4/100° C.) but also a vulcanization process that begins slowly (long scorch time), while the full vulcanization process that follows, with exposure to heat, should proceed as rapidly as possible, so that short production cycles and low energy costs can be achieved. Examples of auxiliaries used for this purpose in the prior art are vulcanization accelerators such as sulfenamides, e.g. CBS (n-cyclohexyl-benzothiazole-2-sulfenamides). There has been no disclosure to the effect that plasticizers and/or processing additives can increase scorch time and can accelerate full vulcanization. The person skilled in the art moreover expects plasticizers to exert an adverse effect on hardness.

Triacetin (glycerol triacetate, CAS No. 102-76-1) is described by way of example as plasticizer for starch (WO 9005161 A1), polylactide (U.S. Pat. No. 6,117,928), and rubber erasers (JP2002254894). A use as plasticizer in acrylonitrile-butadiene rubber (NBR) is mentioned in Plasticization of butadiene acrylonitrile rubber, Senichev, V. Yu, ISSN: 0022-9488. However, the only details provided relate to swelling behavior in plasticized acrylonitrile-butadiene rubber. The better the interaction between the rubber matrix and the "solvent" (in this case triacetin), the higher the degree of swelling, or the swelling at constant crosslinking density. The results from investigation of swelling behavior clearly show that the acrylonitrile-butadiene rubber matrix has a very low swelling index in respect of triacetin. From this, the person skilled in the art will conclude that triacetin is not a good solvent for acrylonitrile-butadiene rubber, does not exhibit good compatibility in relation to this rubber matrix, and therefore does not substantially alter the flowability of the rubber.

DE 102010005558A describes a plasticizer preparation comprising one or more etherthioethers and/or esterthioethers as component A and one or more esters of glycerol with carboxylic acids as component B, e.g. triacetin. The only application sector mentioned for this mixture is likewise polar rubbers, in particular NBR. The Mooney viscosity (ML 1+4) of this type of triacetin-containing rubber mixture is almost identical with that of a reference mixture not comprising triacetin. However, many applications, in particular tires, use rubbers that are less polar, being primarily nonpolar.

The use of triacetin as plasticizer and/or processing additive in nonpolar types of rubber has not been described. Nor would the person skilled in the art consider this to be practicable, since production of a rubber mixture with good properties depends on compatibility of the components. According to Röthemeyer and Sommer (Kautschuktechnologie [Rubber technology], Hanser Verlag, Munich, Vienna, 2nd edn, 2006, ISBN-13: 978-3-448-40480-9, pp. 331-333) plasticizer compatibility in a rubber can be estimated on the basis of the solubility parameter of rubber and plasticizers. The solubility parameter difference here should, at a first approximation, be within ±10%. Rubber solubility parameters provided in said publication are as follows:

| Rubber | Solubility parameter (MPa)$^{1/2}$ |
| --- | --- |
| EPDM (ethylene/propylene/diene rubber) | 16.1 |
| NR (natural rubber) | 16.5 |
| BR (butadiene rubber) | 17.1 |
| SBR (styrene/butadiene rubber) | 17.6 |
| CR (chloroprene rubber) | 19.0 |
| NBR (acrylonitrile-butediene rubber) | 19.0 |
| Plasticizer | Solubility parameter (MPa)$^{1/2}$ |
| Glycerol triacetate (triacetin) | 22.0* |

*via conversion of the triacetin value of 10.77 cal/m3 as in EP 1813310 using the factor 1 cal/m3 = 2.0455 MPa.

On the basis of the teaching of Röthemeyer and Sommer the person skilled in the art expects triacetin not generally to have good solubility in nonpolar rubbers, e.g. in rubbers with solubility product 17.6, since the difference between the solubility products is already 20%.

It was an object of the present invention to provide rubber mixtures which can be converted to vulcanizates with high hardness and elongation at break and which are based on nonpolar rubbers with improved processing properties such as low Mooney viscosity, long scorch time, and short full vulcanization time.

Surprisingly, it has now been found that addition of short-chain alkyl esters of glycerol to rubber mixtures comprising nonpolar rubbers and fillers considerably lowers Mooney viscosity, leading to substantially better processability. The addition of the alkyl esters also increases scorch times and reduces full vulcanization time, and also achieves good vulcanizate hardness, with no substantial impairment of wet grip.

The present invention provides rubber mixtures comprising at least in each case one nonpolar rubber, filler, and short-chain alkyl esters of glycerol as in formula (I):

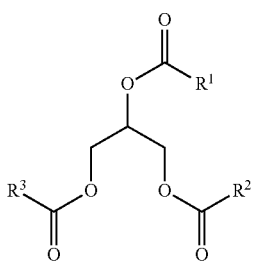

in which

R1, R2, and R3 are mutually independently hydrogen or a straight-chain or branched C1 to C4-alkyl moiety, preferably a straight-chain or branched C1 to C4-alkyl moiety, particularly preferably a straight-chain or branched C1 to C2-alkyl moiety, and very particularly preferably methyl.

The compound of the formula (I) in which R1, R2, and R3 are methyl is called glycerol triacetate, 1,2,3-propantriol triacetate, or else triacetin, and is obtainable commercially. All compounds of the formula (I), moreover provide the advantage that they can be obtained from plant-derived glycerol, i.e. can be obtained at least to some extent from renewable raw materials.

Surprisingly, it has moreover been found that the compounds of the formula (I), in particular triacetin, are capable of solvating or dissolving cellulose and/or cellulose derivates, in particular reaction products of cellulose with phenyl isocyanate, n-butyric anhydride, acetic anhydride, butyl isocyanate, stearyl chloride, stearyl isocyanate, or butyryl chloride, and thus of permitting advantageous use in the present rubber mixtures. Preference is given to cellulose derivates obtainable via use of carboxylic acids to esterify cellulose, and cellulose acetate is very particularly preferred. The cellulose or derivatives thereof here can be used alone or in any desired mixture, but most preference is given here to sole use of cellulose acetate. The total proportion of compounds of the formula (I) in rubber mixtures of the invention is generally from 1-40 phr, preferably from 2-20 phr, particularly preferably from 4-15 phr, and very particularly preferably from 6-10 phr, but when compounds of the formula (I) are used together with cellulose and/or cellulose derivates the content of triacetin in the rubber preparations of the invention can be higher, and can be in the range from 0.1 to 80 phr, preferably from 0.2 to 60 phrs and particularly preferably from 0.5 to 45 phr, in particular from 5-30 phr, the content of cellulose and/or cellulose derivates here then typically being from 0.1 to 100 phr, preferably from 0.2 to 50 phr, particularly preferably from 0.3 to 30 phr, and most preferably from 0.3 to 10 phr. The unit phr represents parts by weight based on 100 parts by weight of rubber used in the rubber mixture.

Rubber

The rubber mixture of the invention comprises at least one nonpolar rubber. For the purposes of the present application, this means rubbers which have a solubility product in accordance with the method described by Röthemeyer and Sommer in the above literature that is no more than 18.0, preferably in the range from 18 to 18, particularly preferably in the range from 18.5 to 17.6. Preference is given to rubbers based on dienes, in particular to rubbers containing double bonds but comprising practically no gel content, and classified in accordance with DIN/ISO 1629 as R rubbers. These rubbers comprise double bonds in the main chain. Examples of rubber components preferably used are those based on NR: natural rubber
or based on synthetic rubbers, examples being:
SBR: styrene/butadiene rubber
BR: polybutadiene rubber
IR: polyisoprene
SIBR: styrene/isoprene rubber
IIR: butyl rubber (isobutene/isoprene rubber)
and mixtures thereof.

Rubbers containing double bonds in the invention also include those which in accordance with DIN/ISO are 1829 M rubbers, and have double bonds in pendant chains alongside the saturated main chain. Among these is by way of example EPDM.

Preference is given in the invention to rubbers from the group of NR, BR, SBR, IIR, and EPDM, particularly NR, BR, and SBR, very particularly NR and BR, and also to mixtures of these rubbers.

The expression styrene/diolefin (in particular butadiene) rubbers covers solution SBR rubbers, abbreviated to: SSBR, and also emulsion SBR rubbers, abbreviated to: ESBR. SSBR means rubbery polymers which are produced in a solution process based on vinylaromatics and on conjugated dienes. Suitable vinylaromatic monomers are styrene, o-, m-, and p-methylstyrene, technical methylstyrene mixtures, p-tert-butylstyrene, p-methoxystyrene, vinylnaphthalene, divinylbenzene, trivinylbenzene, and divinylnaphthalene. Styrene is preferred. The content of vinylaromatic incorporated into the polymer is preferably from 5 to 50% by weight, particularly preferably from 10 to 40% by weight. Suitable diolefins are 1,3-butadiene, isoprene, 1,3-pentadiene, 2,3-dimethylbutadiene, 1-phenyl-1,3-butadiene, and 1,3-hexadiene, preferably 1,3-butadiene and isoprene. The content of dienes incorporated into the polymer is generally from 50 to 95% by weight, preferably from 60 to 90% by weight. The content of vinyl groups in the diene incorporated into the polymer is generally from 10 to 90%, and the content of 1,4-trans double bonds is from 20 to 80%. The content of 1,4-cis double bonds is complementary to the entirety of vinyl groups and 1,4-trans double bonds. The vinyl content of the SSBR Is preferably >20%. Among the SBR rubbers, preference is given to SSBR rubbers.

The distribution of the polymerized monomers and different diene configurations in the polymer is usually random. The definition of SSBR (A) is also intended to cover rubbers termed integral rubbers with block-type structure. The definition of SSBR covers linear and branched or end-group-modified rubbers.

The solution-polymerized vinylaromatic/diolefin rubbers advantageously have Mooney values of from 20 to 150 Mooney units, preferably from 30 to 100 Mooney units. In particular the high-molecular-weight ESBR types with Mooney values >80 MU can comprise quantifies of from 30 to 100 parts by weight of oils, based on 100 parts by weight of rubber. The glass transition temperatures of the oil-free SSBR rubbers are from −80° to +20° C., determined via differential scanning calorimetry (DSC).

ESBR means rubbery polymers that are produced in an emulsion process based on vinylaromatics, on conjugated dienes, and optionally on other monomers. Vinylaromatics are styrene, p-methylstyrene, and alpha-methylstyrene. Dienes are in particular butadiene and isoprene. The contents of vinylaromatics are from 10 to 60% by weight. The glass transition temperature is from −50 to +20° C. (determined by means of DSC) and the Mooney values are from 20 to 150 Mooney units. In particular the high-molecular-weight ESBR types with Mooney values >80 MU can comprise quantities of from 30 to 100 parts by weight of oils, based on 100 parts by weight of rubber. The glass transition temperatures of the oil-free SSBR rubbers are from −80° C. to +20° C., determined via differential scanning calorimetry (DSC).

Polybutadiene (BR) comprises in particular two different classes of polybutadiene type. The first class has at least 90% 1,4-cis content, and is produced with the aid of Ziegler/Natta catalysts based on transition metals. It is preferable to use catalyst systems based on Ti-, Ni-, Co-, and Nd-. The glass transition temperature of this polybutadiene is preferably ≤90° C. (determined by means of DSC).

The second class of polybutadiene type is produced by using Li catalysts, and has vinyl contents of from 10% to 80%. The glass transition temperatures of these polybutadiene rubbers are in the range from −90 to +20° C. (determined by means of DSC).

The rubbers used in the invention can also have been extended with mineral oils.

Particularly preferred rubber mixtures of the invention are free from nitrile rubber NBR. Very particularly preferred rubber mixtures of the invention are free from nitrile rubber NBR, from hydrogenated nitrile rubber HNBR, from styrene/butadiene/acrylonitrite rubber SNBR, and from carboxylated butadiene-acrylonitrile rubber XNBR, also in hydrogenated form HXNBR. For the purposes of this invention, 'free' means content of less than 10 phr, preferably less than 1 phr, particularly preferably less than 0.1 phr, and very particularly preferably less than 0.01 phr, of the relevant rubber.

In one preferred embodiment, the sum of the products of proportion (in phr) and solubility parameter of the rubbers present in the rubber mixture, divided by 100, is no greater than 18, preferably in the range from 18 to 18, and particularly preferably in the range from 17.6 to 18.5.

Fillers

It is preferable that the rubber mixture of the invention comprises at least one filler from the group of the oxidic fillers containing hydroxy groups, preferably at least one silicon-containing oxide filler containing hydroxy groups, particularly preferably silica, very particularly preferably hydrophilic silica which bears hydroxy groups at the surface.

Silica can in particular be used in the form of fumed silica or precipitated silica, preference being given in the invention to precipitated silica. The silicas can optionally also take the form of mixed oxides with other metal oxides, such as oxides of Al, of Mg, of Ca, of Ba, of Zn, of Zr, or of Ti. It is preferable use to use silicas with BET specific surface areas of from 5 to 1000 $m^2/g$, particularly from 20 to 400 $m^2/g$.

Rubber mixtures of the invention preferably comprise from 5 to 100 phr of oxidic fillers containing hydroxy groups, particularly from 30 to 100 phr, and very particularly from 50 to 90 phr. The proportion of oxidic fillers containing hydroxy groups, based on the total quantity of fillers used, Is preferably at least 30%, particularly preferably at least 50%.

Other fillers suitable for the rubber mixtures of the invention are carbon blacks, in particular carbon blacks produced by the lamp-black, furnace-black or gas-black process which have BET surface areas of from 5 to 200 $m^2/g$, for example SAP, ISAF, IISAF, HAF, FEF, or GPF carbon blacks. The total quantity of carbon blacks present in the rubber mixture of the invention can be from 0 to 160 phr, preferably from 1 to 100 phr, particularly preferably from 5 to 80 phr.

If the rubber mixture of the invention comprises carbon black and oxidic fillers containing hydroxy groups, the total quantity of these two types of filler Is preferably from 20 to 160 phr, particularly preferably from 25 to 140 phr. It is very particularly preferable in the present invention to use at least 5 phr of carbon black together with at least 25 phr of silica.

Other fillers that can optionally be used are:
synthetic silicates, such as aluminum silicate, alkaline earth metal silicate, such as magnesium silicate or calcium silicate with BET surface areas of from 20-400 $m^2/g$ and with primary particle diameters of from 5-400 nm,
natural silicates, such as kaolin and other naturally occurring silicas,
metal oxides, such as zinc oxide, calcium oxide, magnesium oxide, aluminum oxide,
metal carbonates such as calcium carbonate, magnesium carbonate, zinc carbonate,
metal sulfates, such as calcium sulfate, barium sulfate,
metal hydroxides, such as aluminum hydroxide and magnesium hydroxide,
glass fibers and glass fiber products (matts, strands, or glass microspheres), Silanes For the Surface-Modification of Fillers The surface of silica and of other fillers having silanol groups at the surface can easily be modified by mono- and polyfunctional organic silanes, with formation of organic siloxanes. This improves interaction with nonpolar rubbers. The rubber mixture of the invention can therefore comprise one or more of these organic silanes, preferably sulfur-containing organic silanes. Preference is given here to compounds comprising one or more alkoxysilyl groups, in particular one or more trialkoxysilyl groups.

Very particularly preferred sulfur-containing organic silanes are bis(triethoxysilyl-propyl-polysulfanes), such as bis(triethoxysilylpropyl) disulfide and bis(triethoxisilylpropyl) tetrasulfide, which are obtainable by way of example with trade names Silan Si 75 and Silan Si 69 from Degussa. Vary particular preference is likewise given to S-thiocyanatopropyltriethoxysilane such as Si 284 from Evonik, 3-(triethoxysilyl)-1-propanediol, and polyether-functionalized mercaptosilanes such as Si 383 from Evonik.

The quantity typically used of the sulfur-containing organosilicon compounds is from 0.1 phr to 14 phr, preferably from 0.2 to 12 phr, particularly preferably from 2 to 10 phr.

In one preferred embodiment, the rubber mixtures of the invention comprise sulfur-containing additives of the type described in EP 2517898, preferably from 0.1-15 phr of these sulfur-containing additives. Very particular preference is given to rubber mixtures of the invention which comprise 2,2'-tetrathiodibenzoic acid (CAS 80304-10-5) in particular in quantities of from 0.1 to 15 phr.

Crosslinking Agents

In one preferred embodiment the present rubber mixtures comprise one or more crosslinking agents. Materials suitable for this purpose are peroxidic crosslinking agents such as bis(2,4-dichlorobenzyl) peroxide, dibenzoyl peroxide, bis(4-chlorobenzoyl) peroxide, 1,1-bis(tert-butylperoxy)-3,3,5-trimethylcylohexane, tert-butyl perbenzoate, 2,2-bis(tert-butylperoxy)butane, 4,4-di-tert-butylperoxynonyl valerate, dicumyl peroxide, 2,5-dimethyl-2,5-di(tert-butylperoxy) hexane, tert-butyl cumyl peroxide, 1,3-bis(tert-butylperoxy-isopropyl)-benzene, di-tert-butylperoxide, and 2,5-dimethyl-2,5-di(tert-butylperoxy)-3-hexyne, or sulfur-based crosslinking agents, particular preference being given here to sulfur-based crosslinking agents.

Sulfur-based crosslinking agents that can be used are sulfur in elemental soluble or insoluble form, or in the form of sulfur donors, for example dimorpholyl disulfide (DTDM), 2-morpholinodithiobenzothiazole (MBSS), caprolactam disulfide, dipentamethylenethiuram tetrasulfide (DPTT), or tetraethylthiuram disulfide (TMTD).

Quantities that can be used of crosslinking agents such as in particular sulfur and sulfur donors are by way of example from 0.1 to 15 phr, preferably from 0.1 to 10 phr. In principle, the crosslinking of the rubber mixtures of the invention can be achieved by using sulfur or sulfur donors alone, but it is preferable that the rubber mixtures of the invention using sulfur or sulfur donors as crosslinking agent comprise at least one vulcanization accelerator, optionally in combination with conventional activators. The quantity typically used of the vulcanization accelerator is from 0.1 to 15 phr, preferably from 0.1 to 10 phr. Examples of suitable vulcanization accelerators are mercaptobenzothiazoles, sulfanamides, guanidines, thiuram disulfides, dithiocarbamates, thioureas, thiocarbonates, and also dithiophosphates, diammine zinc diisocyanate, hexamethylentetramine, 1,3-bis(citraconimidomethyl)benzene and also cyclic disulfanes, etc.

When peroxidic crosslinking agents are used it can be advantageous to use these together with other additions which increase crosslinking yield, for example triallyl isocyanurate, triallyl cyanurate, trimethylolpropane tri(meth)acrylate, triallyl trimellitate, ethylene glycol di(meth)acrylate, butanediol di(meth)acrylate, trimetylolpropane tri(meth)acrylate, zinc diacrylate, zinc dimethacrylate, 1,2-polybutadiene, or N,N'-m-phenylenedimaleimide.

Anti-Reversion Agents

The rubber mixtures of the invention can comprise one or more anti-reversion agents, for example 1,6-bis-(N,N-dibenzylthiocarbamoyldithio)hexane (CAS No.: 151900-44-8), 1,3-bis((3-methyl-2,5-dioxopyrrol-1-yl)methyl)benzene (CAS No.: 119482-58-5), or hexamethylene 1,8-bis(thiosulfate), disodium salt, dihydrate (CAS No.: 5719-73-3). Mention may particularly preferably be made of 1,6-bis-(N,N-dibenzylthiocarbamoyldithio)hexane. The anti-reversion agents mentioned can be used individually or in any desired mixture; the preferred quantity of these is from 0.1 to 20 phr, based on the rubber.

Aging Inhibitors

In order to counter the effect of heat and oxygen, if can be advantageous to add one or more aging inhibitors to the rubber mixture of the invention. Suitable materials are by way of example phenolic aging inhibitors such as alkylated phenols, styrenated phenol, sterically hindered phenols such as 2,6-di-tert-butylphenol, 2,6-di-tert-butyl-p-cresol (BHT), 2,6-di-tert-butyl-4-ethylphenol, sterically hindered phenols containing ester groups, sterically hindered phenols containing thioethers, 2,2'-methylenebis(4-methyl-8-tert-butylphenol) (BPH), and also sterically hindered thiobisphenols.

If discoloration of the rubber is not important, it is also possible to use aminic aging inhibitors, e.g. mixtures of diaryl-p-phenylenediamines (DTPD), or to use octylated diphenylamine (ODPA), phenyl-α-naphthylamine (PAN), phenyl-β-naphthylamine (PBN), preferably those based on phenylenediamine. Examples of phenylenediamines are N-isopropyl-N'-phenyl-p-phenylenediamine, N-1,3-dimethylbutyl-N'-phenyl-p-phenylenediamine (6PPD), N-1,4-dimethylpentyl-N'-phenyl-p-phenylenediamine (7PPD), N,N'-bis-1,4-(1,4-dimethylpentyl)-p-phenylenediamine (77PD).

Other aging inhibitors are phosphites such as tris(nonylphenyl) phosphite, polymerized 2,2,4-trimethyl-1,2-dihydroquinoline (TMQ), 2-mercaptobenzimidazole (MBI), methyl-2-mercaptobenzimidazole (MMBI), zinc methylmercaptobenzimidazole (ZMMBI). The phosphites are generally used in combination with phenolic aging inhibitors. TMQ, MBI, and MMBI are primarily used for NBR types that are vulcanized peroxidically. Typical quantities of the aging inhibitors mentioned added to the rubber mixture of the invention are from 0.1 to 5 phr.

Antioxidants

The ozone-resistance of the rubber mixtures of the invention can be improved via use of antioxidants known to the person skilled in the art, for example N-1,3-dimethylbutyl-N'-phenyl-p-phenylenediamine (6PPD), N-1,4-dimethylpentyl-N'-phenyl-p-phenylenediamine (7PPD), N,N'-bis-1,4-(1,4-dimethylpentyl)-p-phenylenediamine (77PD), enol ethers or cyclic acetals. Typical quantities of the antioxidants added to the rubber mixture of the invention are from 0.1 to 5 phr.

Plasticizers

The rubber mixtures of the invention can comprise conventional plasticizers such as mineral oil and/or synthetic esters, for example phthalic esters, adipic esters, phosphoric esters, citric esters, benzoic esters, and trimilitate esters. The usual quantity used here is from 0.11 to 80 phr, preferably from 0.2 to 60 phrs particularly preferably from 0.5 to 45 phr.

Rubber mixtures preferred in the invention are free from thioethers and thioesters, and from mixed etherthioethers and esterthioethers as described in DE 102010005558 A1. These compounds known as plasticizers are used inter alia to improve the low-temperature flexibility of the rubber. For the purposes of this invention, the term 'free' means content of less than 1 phr, preferably less than 0.1 phr, particularly preferably less than 0.01 phr.

Processing Aids

The rubber mixtures of the invention can moreover comprise conventional processing aids. These processing aids are intended to act between the rubber particles and to counteract frictional forces during the mixing, plasticization and deformation process. The rubber mixture of the invention can comprise, as processing aids, the usual quantities of any of the lubricants conventionally used for the processing of plastics, for example hydrocarbons such as oils, paraffins, and PE waxes, fatty alcohols having from 8 to 20 C atoms, ketones, carboxylic acids such as fatty acids and montanic acids, oxidized PE wax, metal salts of carboxylic acids, carboxamides, and carboxylic esters, for example esters of ethanol, of fatty alcohols, of glycerol, of ethanediol, of pentaerythritol, and of long-chain carboxylic acids as acid component.

Other Additives

Other additives can be added to the rubber mixtures of the invention, examples being flame retardants, UV stabilizers, tackifier resins, other resins, and other tackifiers, pigments, dyes, adhesives and adhesion promoters, blowing agents, antistatic agents, biocides, mineral oil, blowing agents, dyes, pigments, waxes, extenders, organic acids, vulcanization retarders, vulcanization activators such as zinc oxide, stearic acid, and also zinc stearate, metal oxides, and also other filler activators such as triethanolamine, trimethylolpropane, polyethylene glycol, hexane triol, aliphatic trialkoxysilanes, or others known in the rubber industry. The typical quantities used are about 1 to 50 phr.

Plastics

It is optionally also possible that the rubber mixtures of the invention comprise other plastics which by way of example act as polymeric processing aids or impact modifiers. These plastics are selected from the group consisting of the homo- and copolymers based on ethylene, propylene, butadiene, styrene, vinyl acetate, vinyl chloride, glycidyl acrylate, glycidyl methacrylate, or on acrylates and methacrylates having alcohol components of branched or unbranched C1- to C10-alcohols. Mention may be made in particular of polyacrylates having identical or different alcohol moieties from the group of the C4- to C8-alcohols, particularly of butanol, hexanol, octanol, and 2-ethylhexanol, polymethyl methacrylate, methyl methacrylate-butyl acrylate copolymers, methyl methacrylate-butyl methacrylate copolymers, ethylene-vinyl acetate copolymers, chlorinated polyethylene, ethylene-propylene copolymers, and ethylene-propylene-diene copolymers.

Particular preference is given to rubber mixtures comprising at least one rubber from the group of the synthetic rubbers mentioned previously by way of example and from 1 to 40 phr of compound(s) of the formula (I), from 0.05 to 10 phr of at least one sulfur/accelerator system from the group of sulfur/sulfenamide systems, and from 50 to 90 phr of oxidic filler(s) containing hydroxy groups, and from 0.2 to 12 phr of at least one silane from the group of the sulfur-containing organosilicon compounds.

Very particular preference is given to rubber mixtures comprising at least one rubber from the group of the styrene-butadiene rubber and polybutadiene and from 1 to 40 phr of compound(s) of the formula (I), from 0.05 to 10 phr of at least one sulfur/accelerator system from the group of sulfur/sulfenamide systems, from 50 to 100 phr of silica with BET specific surface area from 5 to 1000 m$^2$/g, and from 0.2 to 12 phr of at least one reinforcing additive selected from the group comprising polyether-functionalized mercaptosilane (e.g. Si 383), bis(triethoxisilylpropyl) tetrasulfide and bis(triethoxysilylpropyl) disulfide.

The rubber mixtures of the invention can be produced in a manner regarded as conventional by the person skilled in the art, in that by way of example the individual constituents are mixed with one another, preferably in a batchwise mixing process (in/on internal mixers and roll mills) typically at a temperature of from 80 to 150° C.

Additives of the formula (I) can be added here to the rubber component either individually or in the form of a mixture in any desired mixing ratio, and in any mixing stage of the mixing process.

The additive of the invention to be used of the formula (I) is preferably added, optionally together with other additional substances, in the first part of the mixing process when temperatures of the composition are from 100 to 200° C., but it can also be added subsequently at lower temperatures (from 40 to 100° C.), e.g. together with sulfur crosslinking agent and/or accelerator.

It is advantageous here that the crosslinking agent and/or the vulcanization accelerator is not added in a mixing step with elevated temperatures, such as that carried out for the activation of the oxidic filler containing hydroxy groups (e.g. silica) by means of the sulfur-containing organosilicon compounds, since this would lead to premature scorch of the mixture. It is therefore preferable that crosslinking agent and/or vulcanization accelerator are incorporated after addition of the sulfur-containing organosilicon compounds at temperatures that are preferably below 100° C.

In one preferred embodiment, the compounds of the formula (I), in particular triacetin, are used after application to a carrier or adsorption onto same (dry liquid), in order to improve ease of metering and/or dispersion. Carrier used can by way of example be the materials listed as filler above, as long as these do not react with the triacetin. It is particularly preferable to use neutral, acidic, or basic silica, carbon black or zinc oxide, and it is very particularly preferable to use, neutral or acidic silica as carrier, most preferably neutral silica. The ratio of the total quantity of liquid compounds of the formula (I) to carrier material (in the dry liquid) is preferably in the range from 5:1 to 1:20, particularly preferably in the range from 2:1 to 1:4, and very particularly preferably in the range from 2:1 to 1:2.

The production of the rubber vulcanizates of the invention is described by way of example:

1st Mixing Stage:

Rubber (e.g. mixture of SBR and BR) are used as initial charge in an internal mixer and mixed for about 30 seconds Optional addition of oxidic filler containing hydroxy groups, and silane for surface-modification (e.g. addition of two thirds of silica, two thirds of silane, mixing for about 60 seconds, and further addition of one third of silica and one third of silane, and mixing for about 60 seconds)

Addition of the additive of the formula (I) and optionally addition of carbon black, oil, aging inhibitors, zinc oxide, and also antiozonant waxes, and mixing for about 60 seconds.

This mixing procedure can take place at temperatures in the range from 100 to 170° C., preferably at 150° C.

2nd Mixing Stage:

After conclusion of the first mixing stage, the mixture is passed to a downstream roll mill and shaped to give a sheet, a strip, or pellets, and stored at room temperature for 24 hours.

The processing temperatures here are below 60° C.

3rd Mixing Stage:

The third mixing stage involves further mastication at from 140 to 170° C., preferably at 150° C., for example in a kneader/internal mixer.

4th Mixing Stage:

Addition of additional substances, for example vulcanization accelerators and/or sulfur crosslinking agents, preferably on a roll at low temperatures (<80° C.).

Suitable assemblies for the production of the mixture are known per se and include by way of example rolls, internal mixers, and also mixing extruders.

Use of compounds of the formula (I) as rubber additive permits improvement of the processability of the rubber mixture: in particular, the scorch time of the rubber mixture is increased while the vulcanization time is reduced, without any adverse effect on the properties of rubber vulcanizates produced therefrom, for example hardness, elongation at break, tensile strength, and abrasion. In particular it is possible to produce tire treads which have a loss factor that is preferably >0.35 at 0° C. (indicator of wet grip). Another advantage provided by the rubber mixtures of the invention is that they are at least to some extent based on constituents obtainable via use of renewable raw materials.

The present invention further provides the use of compounds of the formula (I), in particular of triacetin, for the production of the rubber mixtures of the invention. It is preferably possible to use, for this purpose, the compounds of the formula (I) applied to, or adsorbed onto, a carrier.

The present invention further provides a process for the production of rubber vulcanizates, characterized in that the rubber mixtures of the invention are subjected to full vulcanization in the presence of at least one crosslinking system and/or vulcanization accelerator at a temperature of from 100° C. to 250° C., preferably from 130 to 180° C. A preferred embodiment of the vulcanization process takes place at a pressure of from 1 to 200 bar. Sulfur crosslinking with use of the abovementioned crosslinking systems is preferred for the vulcanization process.

The present invention also comprises rubber vulcanizates obtainable via vulcanization of the rubber mixtures of the invention and also rubber products comprising these vulcanizates, in particular tires, since corresponding fires have the advantage of high hardness coupled with good rolling resistance and low abrasion.

Use of tires which comprise the vulcanizates of the invention on vehicles, in particular motor vehicles, leads to less use of energy resources during the operation of said vehicles, results being in the case of motor vehicles with internal combustion engines lower fuel consumption, in the case of motor vehicles with electric drive greater range, and in the case of vehicles driven by muscle power less effort and/or higher velocity. The present invention therefore also comprises vehicles comprising rubber products which include the vulcanizates of the invention.

The rubber vulcanizates produced are also suitable for the production of technical rubber items such as damping elements, roll coverings, coverings of conveyor belts, drive belts, spinning cops, gaskets, golfball cores, shoe soles, etc.

EXAMPLES

The present Invention is explained below with reference to examples, but is not restricted thereto.

Constituents of the Rubber Mixtures of the Invention:
1) Buna® VSL 5025-2 and Buna® VSL 5025-1: oil-extended SBR from Lanxess Deutschland GmbH
2) Buna® CB 24: BR from Lanxess Deutschland GmbH
3) Vulkasil S: silica from Lanxess Deutschland GmbH
4) Tudalen 1849-1: mineral oil from Hansen&Rosenthal KG
5) Rotsiegel zinc white; zinc oxide from Grille Zinkoxid GmbH
8) Edenor® C 18 98-100: stearic acid from Cognis Deutschland GmbH
7) Polymerized 2,2,4-trimethyl-1,2-dihydroquinoline (Vulkanox® HS/LG from Lanxess Deutschland GmbH)
8) N-1,3-dimethylbutyl-N'-phenyl-p-phenylenediamine (Vulkanox® 4020/LG from Lanxess Deutschland GmbH)
9) Antilux® 854: light stabilizer from RheinChemie GmbH
10) Bis(triethoxysilylpropyl) polysulfide (Si® 69 from Degussa Hüls AG)
11) Corax® N 339: carbon black from Degussa Hüls AG
12) Soluble sulfur (Chancel® 90/95° ground sulfur from Solvay Barium Strontium)
13) N-Cyclohexyl-2-benzthiazylsulfenamide (Vulkacit® CZ from Lanxess Deutschland GmbH)
14) Diphenylguanidine (Vulkacit® D/C from Lanxess Deutschland GmbH)
15) Triacetin (CAS No.: 102-76-1) from Lanxess Deutschland GmbH
16) Mixture of 4 percent by weight of cellulose acetate (CAS No.: 9004-35-7) from Eastman and 96 percent by weight of triacetin (CAS No.: 102-78-1) from Lanxess Deutschland GmbH
17) Mixture of 50 percent by weight of Vulkasil N from Lanxess Deutschland GmbH (precipitated silica) and 50 percent by weight of triacetin (CAS No.: 102-78-1) from Lanxess Deuschland GmbH
18) Mixture of 50 percent by weight of Vulkasil A 1 from Lanxess Deutschland GmbH (precipitated sodium aluminum silicate) and 50 percent by weight of Triacetin (CAS No.: 102-78-1) from Lanxess Deuschland GmbH
19) Mixture of 50 percent by weight of Vulkasil S from Lanxess Deutschland GmbH (precipitated silica) and 50 percent by weight of triacetin (CAS No.: 102-78-1) from Lanxess Deuschland GmbH
20) VP Si 383 from Evonik (bifunctional organosilane)
21) Vulkalink 1871 from Lanxess Deutschland GmbH (2,2'-tetrathiodibenzoic acid)

Production of the Rubber Vulcanizates of the Invention

For inventive example 1, and also for the reference example, vulcanizates were produced from the rubber formulations listed in Table 1. This was achieved in each case by mixing the respective constituents of inventive example 1, and also of the reference example, in a multistage mixing process as described below, and then subjecting the mixtures to full vulcanization at 170° C.

1st Mixing Stage:

BUNA® CB 24 and BUNA® VSL 5025-2 were used as initial charge in an internal mixer, and mixed for about 30 seconds Addition of two thirds of VULKASIL® S, and two thirds of SI® 69, and mixing for about 60 seconds Addition of one third of VULKASIL® 5, one third of SI® 69, and also TUDALEN 1849-1, and mixing for about 60 seconds Addition of CORAX® N 339, EDENOR® C 18 98-100, VULKANOX® 4020/LG, VULKANOX® HS/LG, ROTSIEGEL ZINC WHITE, ANTILUX® 654, and also triacetin, and optionally cellulose acetate, and mixing for about 60 seconds The temperature for this mixing procedure was 150° C.

2nd Mixing Stage:

After conclusion of the first mixing stage, the mixture was passed to a downstream roll mill and shaped to give a sheet, and stored at room temperature for 24 hours.

The processing temperatures here are below 60° C.

3rd Mixing Stage:

The third mixing stage involved further mastication at 150° C. in a kneader.

4th Mixing Stage:

Addition of the additional substances CHANCEL 90/95 GROUND SULFUR, VULKACIT® CZ/C, and VULKACIT® D/C on a roll at temperatures below 80° C.

The rubber mixtures and vulcanizates produced were subjected to the technical tests stated below. The values determined can likewise be found in Table 1.

Testing of the Rubber Mixtures and of the Vulcanizates:

Mooney Viscosity Measurement:

Viscosity can be determined directly from the force with which the rubbers (and rubber mixtures) resist processing thereof. In the Mooney shearing-disk viscometer a grooved disk is surrounded above and below by sample substance and is rotated at about two revolutions per minute in a beatable chamber. The force required for this purpose is measured in the form of torque, and corresponds to the respective viscosity. The sample is generally preheated to 100° C. for one minute; the measurement takes a further four minutes, while the temperature is kept constant.

Viscosity is stated together with the respective test conditions, an example being ML (1+4) 100° C. (Mooney viscosity, large rotor, preheat time and test time in minutes, test temperature).

The viscosities of the rubber mixtures specified in Table 1 are measured by means of Mooney shearing-disk viscometers in accordance with ASTM D1846.

The same test is moreover used to measure the "Scorch" behavior of the mixtures. The temperature is 130° C. The rotor runs until, after the torque value has passed through a minimum, it has risen to five Mooney units relative to the minimum value (t5). The greater the value (the unit here being seconds), the slower the scorch (high scorch values here).

Rheometer (vulcameter) 170° C./t95 Full Vulcanization Time:

The progress of vulcanization in an MDR (moving die rheometer) and analytical data therefor are measured in accordance with ASTM D5289-95 In a Monsanto MDR 2000 rheometer. Table 2 collates the results of this test.

The time at which 95% of the rubber has crosslinked is measured as the full vulcanization time. The temperature selected was 170° C.

Determination of Hardness (Shore A):

In order to determine the hardness of the rubber mixture of the invention, milled sheets of thickness 6 mm were produced from the rubber mixture in accordance with formulations of Table 1. Test specimens of diameter 35 mm were cut from the milled sheets, and the Shore A hardness values were determined for these by means of a digital Shore hardness fester (Zwick GmbH & Co. KG, Ulm).

Tensile Test:

The tensile test serves directly to determine the loading limits of an elastomer. The increase in length at break is divided by the initial length to give the elongation at break. The force is also determined when particular stages of elongation are reached, mostly 50, 100, 200, and 300%, and is expressed as modulus (tensile strength for the stated elongation of 300%, or 300 modulus).

Table 1 lists the test results.

Dyn. Damping:

Dynamic test methods are used to characterize the deformation behavior of elastomers under loadings which change periodically. An external stress changes the conformation of the polymer chain.

This measurement determines the loss factor tan delta indirectly by way of the ratio between loss modulus G" and storage modulus G'.

TABLE 1

| Constituent | Unit | Reference example 1 | Inventive example 1 |
|---|---|---|---|
| BUNA CB 24 | phr | 30 | 30 |
| BUNA VSL 5025-2 | phr | 96 | 96 |
| CORAX N 339 | phr | 6.4 | 6.4 |
| VULKASIL S | phr | 80 | 80 |
| EDENOR C 18 98-100 | phr | 1 | 1 |
| VULKANOX 4020/LG | phr | 1 | 1 |
| VULKANOX HS/LG | phr | 1 | 1 |
| ROTSIEGEL ZINC WHITE | phr | 2.5 | 2.5 |
| ANTILUX 654 | phr | 1.5 | 1.5 |
| SI 69 | phr | 6.4 | 6.4 |
| TUDALEN 1849-TE | phr | 8 | 8 |
| VULKACIT D/C | phr | 2 | 2 |
| VULKACIT CZ/C | phr | 1.5 | 1.5 |
| CHANCEL 90/95 GROUND SULFUR | phr | 1.5 | 1.5 |
| Triacetin | phr | | 8 |
| Mooney viscosity (ML1 + 4) | [MU] | 94 | 71 |
| Scorch time (t5) | sec | 602 | 1141 |
| Full vulcanization time (t95) | s | 1494 | 1369 |
| Elongation at break | % | 387 | 406 |
| Shore A hardness | Shore A | 65 | 66 |
| Tensile strength | MPa | 22 | 20 |
| Wet grip [tan δ (0° C.)] | — | 0.430 | 0.417 |

| Constituent | Unit | Reference example 1 | Inventive example 1a |
|---|---|---|---|
| BUNA CB 24 | phr | 30 | 30 |
| BUNA VSL 5025-2 | phr | 96 | 96 |
| CORAX N 339 | phr | 6.4 | 6.4 |
| VULKASIL S | phr | 80 | 80 |
| EDENOR C 18 98-100 | phr | 1 | 1 |
| VULKANOX 4020/LG | phr | 1 | 1 |
| VULKANOX HS/LG | phr | 1 | 1 |
| ROTSIEGEL ZINC WHITE | phr | 2.5 | 2.5 |
| ANTILUX 654 | phr | 1.5 | 1.5 |
| SI 69 | phr | 6.4 | 6.4 |
| TUDALEN 1849-TE | phr | 8 | 8 |
| VULKACIT D/C | phr | 2 | 2 |
| VULKACIT CZ/C | phr | 1.5 | 1.5 |
| CHANCEL 90/95 GROUND SULFUR | phr | 1.5 | 1.5 |
| 1:1 - Mixture of Triacetin:Vulkasil N | phr | | 16 |
| Mooney viscosity (ML1 + 4) | [MU] | 94 | 70 |
| Scorch time (t5) | sec | 602 | 1537 |
| Full vulcanization time (t95) | s | 1494 | 1220 |
| Elongation at break | % | 387 | 357 |
| Shore A hardness | Shore A | 65 | 68 |
| Tensile strength | MPa | 22 | 17 |
| Wet grip [tan δ (0° C.)] | — | 0.430 | 0.343 |

| Constituent | Unit | Reference example 1 | Inventive example 1b |
|---|---|---|---|
| BUNA CB 24 | phr | 30 | 30 |
| BUNA VSL 5025-2 | phr | 96 | 96 |
| CORAX N 339 | phr | 6.4 | 6.4 |
| VULKASIL S | phr | 80 | 80 |
| EDENOR C 18 98-100 | phr | 1 | 1 |
| VULKANOX 4020/LG | phr | 1 | 1 |
| VULKANOX HS/LG | phr | 1 | 1 |
| ROTSIEGEL ZINC WHITE | phr | 2.5 | 2.5 |
| ANTILUX 654 | phr | 1.5 | 1.5 |
| SI 69 | phr | 6.4 | 6.4 |
| TUDALEN 1849-TE | phr | 8 | 8 |
| VULKACIT D/C | phr | 2 | 2 |
| VULKACIT CZ/C | phr | 1.5 | 1.5 |
| CHANCEL 90/95 GROUND SULFUR | phr | 1.5 | 1.5 |
| 1:1 - Mixture of Triacetin:Vulkasil A 1 | phr | | 16 |
| Mooney viscosity (ML1 + 4) | [MU] | 94 | 65 |
| Scorch time (t5) | sec | 602 | 1393 |
| Full vulcanization time (t95) | s | 1494 | 1177 |
| Elongation at break | % | 387 | 382 |
| Shore A hardness | Shore A | 65 | 68 |
| Tensile strength | MPa | 22 | 18 |
| Wet grip [tan δ (0° C.)] | — | 0.430 | 0.417 |

| Constituent | Unit | Reference example 1 | Inventive example 1c |
|---|---|---|---|
| BUNA CB 24 | phr | 30 | 30 |
| BUNA VSL 5025-2 | phr | 96 | 96 |
| CORAX N 339 | phr | 6.4 | 6.4 |
| VULKASIL S | phr | 80 | 80 |
| EDENOR C 18 98-100 | phr | 1 | 1 |
| VULKANOX 4020/LG | phr | 1 | 1 |
| VULKANOX HS/LG | phr | 1 | 1 |
| ROTSIEGEL ZINC WHITE | phr | 2.5 | 2.5 |
| ANTILUX 654 | phr | 1.5 | 1.5 |
| SI 69 | phr | 6.4 | 6.4 |
| TUDALEN 1849-TE | phr | 8 | 8 |
| VULKACIT D/C | phr | 2 | 2 |
| VULKACIT CZ/C | phr | 1.5 | 1.5 |
| CHANCEL 90/95 GROUND SULFUR | phr | 1.5 | 1.5 |
| 1:1 - Mixture of Triacetin:Vulkasil S (1:1) | phr | | 16 |
| Mooney viscosity (ML1 + 4) | [MU] | 94 | 72 |
| Scorch time (t5) | sec | 602 | 1557 |
| Full vulcanization time (t95) | s | 1494 | 1319 |
| Elongation at break | % | 387 | 361 |
| Shore A hardness | Shore A | 65 | 70 |
| Tensile strength | MPa | 22 | 16 |
| Wet grip [tan δ (0° C.)] | — | 0.430 | 0.343 |

| Constituent | Unit | Inventive example 1d | Inventive example 1e |
|---|---|---|---|
| BUNA CB 24 | phr | 30 | 30 |
| BUNA VSL 5025-2 | phr | 96 | 96 |

TABLE 1-continued

| | | | |
|---|---|---|---|
| CORAX N 339 | phr | 6.4 | 6.4 |
| VULKASIL S | phr | 72 | 72 |
| EDENOR C 18 98-100 | phr | 1 | 1 |
| VULKANOX 4020/LG | phr | 1 | 1 |
| VULKANOX HS/LG | phr | 1 | 1 |
| ROTSIEGEL ZINC WHITE | phr | 2.5 | 2.5 |
| ANTILUX 654 | phr | 1.5 | 1.5 |
| SI 69 | phr | 6.4 | — |
| TUDALEN 1849-TE | phr | 8 | 8 |
| VULKACIT D/C | phr | 2 | 2 |
| VULKACIT CZ/C | phr | 1.5 | 1.5 |
| CHANCEL 90/95 GROUND SULFUR | phr | 1.5 | 1.5 |
| 1:1 - Mixture of Triacetin:Vulkasil N | phr | 16 | 16 |
| Vulkalink 1871 | phr | 1 | — |

It has been found that additives of the formula (I) lead to rubber mixtures with markedly reduced rubber viscosity (Mooney viscosity), and to vulcanizates with markedly increased scorch time together with reduced full vulcanization time. The hardness values are moreover very good.

In another series of experiments with use of BUNA VSL 5025-1 instead of BUNA VSL 5025-2 (lower oil content), the use of cellulose acetate in the form of 4% solution in triacetin was studied. Table 2 shows the results:

TABLE 2

| Constituent | Unit | Reference example 2 | Inventive example 2 | Inventive example 3 |
|---|---|---|---|---|
| BUNA CB 24 | phr | 30 | 30 | 30 |
| BUNA VSL 5025-1 | phr | 96 | 96 | 96 |
| CORAX N 339 | phr | 6.4 | 6.4 | 6.4 |
| VULKASIL S | phr | 80 | 80 | 80 |
| TUDALEN 1849-1 | phr | 8 | 8 | 0 |
| EDENORC 18 98-100 | phr | 1 | 1 | 1 |
| VULKANOX 4020/LG | phr | 1 | 1 | 1 |
| VULKANOX HS/LG | phr | 1 | 1 | 1 |
| ROTSIEGEL ZINC WHITE | phr | 2.5 | 2.5 | 2.5 |
| ANTILUX 654 | phr | 1.5 | 1.5 | 1.5 |
| SI 69 | phr | 6.4 | 6.4 | 6.4 |
| CHANCEL 90/95 GROUND SULFUR | phr | 1.5 | 1.5 | 1.5 |
| VULKACIT CZ/C | phr | 1.5 | 1.5 | 1.5 |
| VULKACIT D/C | phr | 2 | 2 | 2 |
| Cellulose acetate/Triacetin 4:96 | phr | | 10 | 20 |
| Mooney viscosity (ML 1 + 4) | [MU] | 91 | 66 | 66 |
| Scorch time (t5) | sec | 1085 | 1582 | 1468 |
| Full vulcanization time (t95) | sec | 1213 | 1091 | 940 |
| Hardness | [Shore A] | 70 | 70 | 69 |
| Elongation at break | % | 338 | 377 | 388 |
| Tensile strength | MPa | 18 | 19 | 16 |
| tan δ (0° C.) | | 0.458 | 0.416 | 0.399 |
| tan δ (60° C.) | | 0.147 | 0.142 | 0.123 |

A significant improvement of flowability (reduction of Mooney viscosity) is also apparent when 4% cellulose acetate in triacetin is used. Furthermore, even addition of 10 phr of this additive mixture increases scorch time and elongation at break, and reduces full vulcanization time. If, as shown in inventive example 3, the plasticizer oil (TUDALEN 1349-1) is omitted and replaced by an increase in the quantity of cellulose acetate/triacetin used to 20 phr, there is a surprisingly sharp reduction in the tan δ value at 60° C. (indicator of rolling resistance), indicating significantly reduced rolling resistance, with retention of the good flowability, scorch time, elongation at break, and full vulcanization time. At the same time, hardness and wet grip remain at a good performance level.

What is claimed is:

1. A rubber mixture comprising: at least one crosslinking agent
   at least one nonpolar rubber selected from the group consisting of NR, SBR, BR, IR, SIBR, IIR, ENR, and EPDM,
   carbon black, and
   short-chain alkyl esters of glycerol as in formula (I):

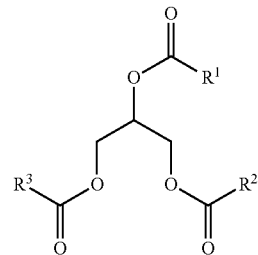

in which R1, R2, and R3 are mutually independently hydrogen or a straight-chain or branched C1-C4-alkyl moiety.

2. The rubber mixture as claimed in claim 1, wherein R1, R2, and R3 are methyl.

3. The rubber mixture as claimed in claim 1, wherein the rubber mixture has a content of compounds of the formula (I) of 1 to 40 phr.

4. The rubber mixture as claimed in claim 1, wherein, if present, the rubber mixture has a content of less than 10 phr of any of NBR, HNBR, SNBR, HXNBR, or XNBR.

5. The rubber mixture as claimed in claim 1, further comprising at least one oxidic filler containing hydroxy groups.

6. The rubber mixture as claimed in claim 1, further comprising 50 to 100 phr of oxidic filler containing hydroxy groups, and 0.2 to 12 phr of organic silanes.

7. The rubber mixture as claimed in claim 1, further comprising cellulose and/or cellulose derivatives.

8. The rubber mixture as claimed in claim 1, wherein the compound of the formula (I) is applied to a carrier or adsorbed onto a carrier.

9. A process for the production of a rubber mixture as claimed in claim 1, the process comprising mixing the at least one crosslinking agent, at least one nonpolar rubber, the carbon black, and the short-chain alkyl ester of glycerol as in formula (I) with one another at a temperature of 80 to 150° C.

10. A process for the production of rubber vulcanizates, the process comprising vulcanizing the rubber mixture as claimed in claim 1 at a temperature of 100 to 250° C.

11. The process for the production of vulcanizates as claimed in claim 10, wherein the vulcanization temperature is 130 to 180° C.

12. A vulcanizate obtained via vulcanization of the rubber mixtures as claimed in claim 1.

13. A rubber product comprising one or more rubber vulcanizates as claimed in claim 12.

14. A vehicle comprising the rubber product as claimed in claim 13.

15. The rubber mixture as claimed in claim 1, wherein:
   the at least one non-polar rubber comprises at least one of NR, SBR, BR, IIR and EPDM;

the rubber mixture has a content of compounds of the formula (I) of 2 to 20 phr;

if present, the rubber mixture has a content of less than 1 phr of any of NBR, HNBR, SNBR, HXNBR, or XNBR; and the rubber mixture further comprises:
- at least one cross-linking agent;
- 50 to 100 phr of at least one oxidic filler containing hydroxy groups;
- 0.2 to 12 phr of organic silanes; and
- cellulose and/or cellulose derivatives.

16. The rubber mixture as claimed in claim 15, wherein:

the compound of the formula (I) is applied to a carrier or adsorbed onto a carrier:

the at least one cross-linking agent comprises at least one of peroxidic crosslinking agents and sulfur-based cross-linking agents;

the organic silanes comprise sulfur-containing organic silanes; and the cellulose derivatives are carboxylic acid esters of cellulose.

17. The rubber mixture as claimed in claim 16, wherein:

the at least one non-polar rubber comprises at least one of NR, BR and SBR;

the at least one cross-linking agent comprises at least one of sulfur, dimorpholyl disulfide (DTDM), 2-morpholinodithiobenzothiazole (MBSS), caprolactam disulfide, dipentamethylenethiuram tetrasulfide (DPTT), and tetramethylthiuram disulfide (TMTD);

wherein the rubber mixture has a content of compounds of the formula (I) of 6 to 10 phr, and the carrier comprises at least one substance selected from the group comprising neutral, acidic or basic silica, carbon black, or zinc oxide;

if present, the rubber mixture has a content of less than 0.01 phr of any of NBR, HNBR, SNBR, HXNBR, or XNBR;

the cellulose derivatives are cellulose acetates;

the oxidic filler containing hydroxy groups comprises silica filler with BET specific surface area of 5 to 1000 $m^2/g$; and the sulfur-containing organic silanes comprise trialkoxysilyl groups.

* * * * *